United States Patent [19]
Marquardt

[11] 3,789,611
[45] Feb. 5, 1974

[54] BRAKE VALVE FOR A HYDRAULIC BRAKE INSTALLATION

[75] Inventor: Friedbert Marquardt, Korb, Germany

[73] Assignee: Daimler-Benz Aktiengesellschaft, Stuttgart-Unterturkheim, Germany

[22] Filed: Feb. 17, 1972

[21] Appl. No.: 227,038

[30] Foreign Application Priority Data
Feb. 17, 1971   Germany............................ 2107478

[52] U.S. Cl..................... 60/566, 60/581, 188/359, 303/52, 303/54
[51] Int. Cl............................ F15b 7/08, B60t 15/04
[58] Field of Search .. 60/54.5, 54.6 P, 54.5, 54.6 E, 60/52 B, 566, 581; 188/359; 303/52, 54

[56] References Cited
UNITED STATES PATENTS

| | | | |
|---|---|---|---|
| 1,814,565 | 7/1931 | Lombard ............................. | 303/54 |
| 1,533,322 | 4/1925 | Lewis................................... | 303/54 |
| 2,680,654 | 6/1954 | Edge et al............................ | 303/54 |
| 2,799,140 | 7/1957 | Osborne............................... | 188/359 |
| 3,532,395 | 10/1970 | Julow.................................... | 303/54 |
| 2,358,644 | 9/1944 | Kelley................................... | 303/54 |
| 2,698,205 | 12/1954 | Gagen.................................. | 303/54 |

Primary Examiner—Martin P. Schwadron
Assistant Examiner—A. M. Zupcic
Attorney, Agent, or Firm—Craig and Antonelli

[57] ABSTRACT

A brake valve for a hydraulic brake system especially of a motor vehicle which includes a master cylinder with a master piston that is actuatable by way of a piston rod; the pressure space of the master cylinder is connected with the brakes while its backside is adapted to be actuated by an additional regulated servo pressure; the pressure space of the master piston is provided with a valve which is kept open by the regulated servo pressure when the brake is actuated and thereby connects the pressure space with the pressure control valve; the latter is constituted by a displaceable piston guided within a valve bushing.

31 Claims, 1 Drawing Figure

PATENTED FEB 5 1974 3,789,611
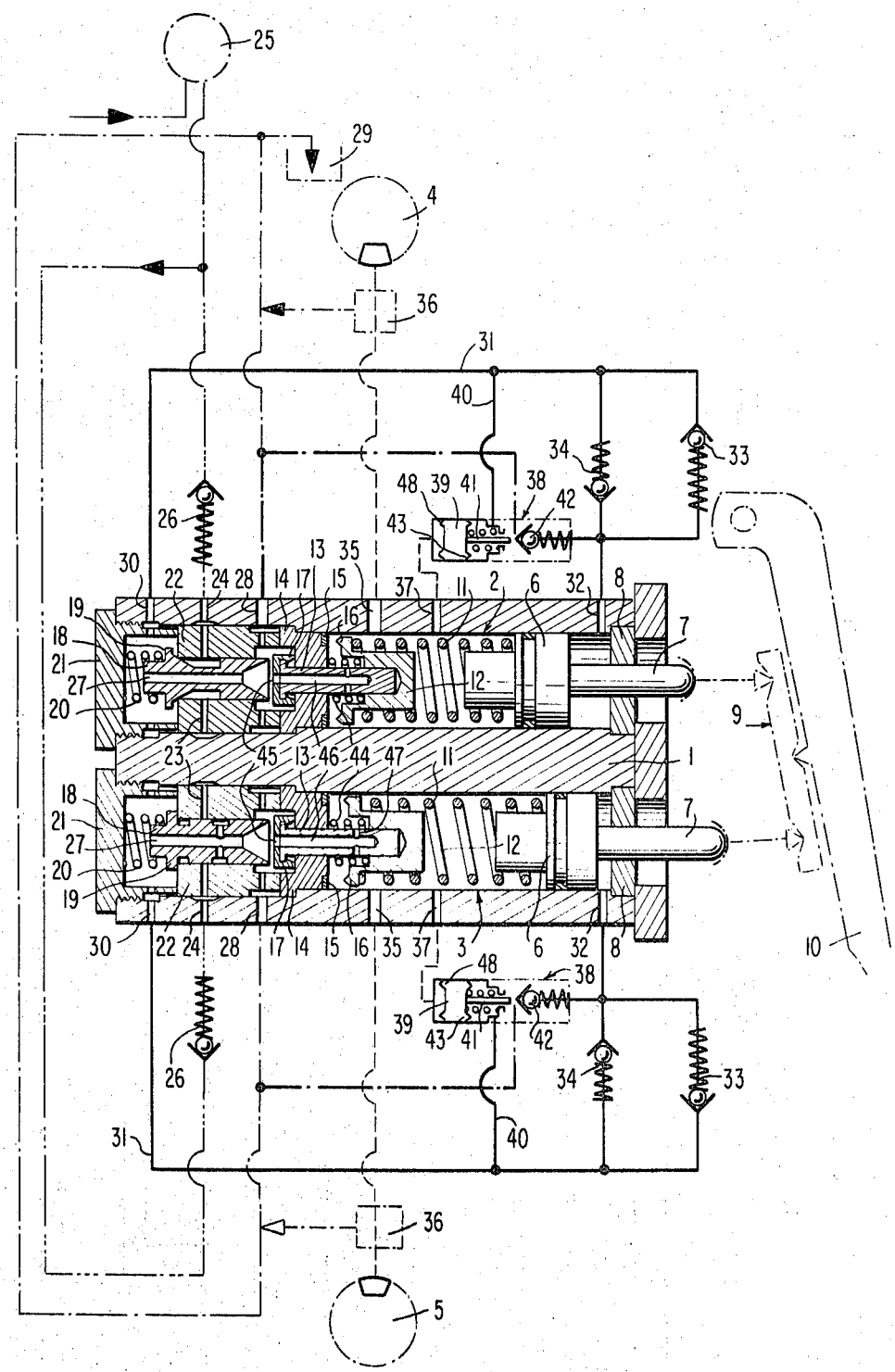

BRAKE VALVE FOR A HYDRAULIC BRAKE INSTALLATION

The present invention relates to a brake valve for a hydraulic brake system, especially of a motor vehicle, which includes a master cylinder with a master piston that is actuatable by way of a piston rod and whose pressure space connected with the brakes as well as the back side thereof are adapted to be acted upon by an additional, controlled accumulator pressure.

The known types of constructions of brake valves which remove from an accumulator system an amplifier or servo energy, the so-called servo-or accumulator-brake valves, are equipped with a pressure tank or accumulator of their own, which means that with a two-circuit brake system, already two pressure tanks have to be provided only for the brake system. This is necessary since the known brake valves do not make possible any longer an actuation of the brakes when the pressure reservoir or accumulator fails.

The present invention is concerned with the task to provide a brake valve of the aforementioned type which is still actuatable even in case of failure of the pressure reservoir or accumulator. The present invention essentially consists in that the pressure space of the master piston is provided with a valve which upon actuation of the brake is kept open by the controlled accumulator pressure and connects the pressure space with the pressure control valve. When the accumulator pressure fails, I.E., when it is lost, then the pressure space of the master piston is closed so that an actuation of the brakes without servo-assist is possible. It becomes additionally possible thereby to dispense with pressure accumulators or tanks of their own for the brake system and to connect also in a two-circuit system both pressure spaces with one central tank or accumulator which can also be utilized for other aggregates and which is already present frequently, for example, in vehicles with a hydropneumatic spring system.

In one embodiment of the present invention a servo-brake valve very advantageous as such is provided in that a main spring adapted to be displaced by the master piston, is arranged in the master cylinder which includes at its free end a spring plate or spring washer that is mounted on a coaxial plunger of a disk or plate valve, which is formed by a plate mounted at the end of the plunger and by a piston displaceable against a spring, which together with a connection to the pressure tank or accumulator forms the pressure control valve which is in communication with the pressure space of the master piston by way of an axial piston bore, a bore in the plate and bores in the plunger, whereby the piston bore at its end cooperating with the plate includes a cross sectional area that is larger than the cross sectional area of the plunger. As a result of this construction a brake characteristic is achieved in an advantageous manner which is dependent on the piston travel of the master piston that is actuated, for example, by a brake pedal.

In order to still enable with this embodiment of the present invention an actuation in case of failure of the pressure accumulator or tank, the connection taking place through the plunger between the pressure space of the master piston and the pressure control valve is adapted to be closed by the spring washer or spring plate. It is thereby appropriate if the spring washer or plate is provided with a knife edge ring to which is coordinated a seal ring which is mounted in a ring guiding the plunger. It is assured by this construction that the thus produced valve is absolutely tight also at high pressures. Appropriately, with this embodiment of the present invention, the plunger is surrounded by a fixing or locating spring which is supported at the spring plate and at the ring. It is assured thereby that in the original or initial position the connection between the pressure space of the master piston and the pressure control valve is always open.

A structurally advantageous pressure control valve is produced in that the piston is guided in a valve bushing which is provided with the radial channels connected with the pressure accumulator or tank. In one embodiment of the present invention, the piston together with the channels forms a slide valve and is provided with radial bores leading to the piston bore. In another embodiment of the present invention, the piston together with the valve sleeve forms a conical valve.

According to a further feature of the present invention, a control valve is connected to the pressure space of the master piston, which includes a piston whose backside is provided with a needle and which is connected to the pressure control valve in front of the plate valve. In order to be able to compensate for a vacuum on the backside of the master piston both during the actuation with a functioning pressure accumulator as also during an actuation without pressure accumulator, the control valve includes a check-valve adapted to be opened by means of the needle of the piston, which is disposed in a connection between the backside of the master piston and a tank and which opens in the presence of a vacuum on the backside of the master piston. In order to achieve that the piston of the control valve is sealed off against high pressures which occur during an actuation when the accumulator installation has failed or broken down, it is advantageous if the backside of the piston of the control valve is constructed as knife edge valve.

In order to load the backside of the master piston with the controlled accumulator pressure during the actuation, the backside of the master piston is connected with the pressure control valve by way of a line in front of the plate valve, in which a check valve is arranged that is prestressed to a predetermined pressure value and which opens in the presence of an excess pressure in the pressure control valve. For purposes of venting or relieving the backside of the master piston during the disengagement of the brake, provision is made that the backside of the master piston is connected to the pressure control valve by way of a line in front of the plate valve, in which is arranged a check valve that opens in case of an excess pressure on the backside of the piston.

In order to enable according to a further particularly advantageous construction of the present invention, the application to a two-circuit brake system, two similar master cylinders are arranged vertically one above the other which are connected to a common brake pedal by way of a scale beamlike equalization lever. A very space-saving construction is made possible by these measures whereas it is additionally assured that only small lost-travel or through-travel paths of the pedal can occur in case of failure of a brake circuit. Additionally, identically constructed brake valves, especially those with master pistons of identical diameter can be utilized. It is structurally advantageous if a common valve housing is provided for the two master cylinders disposed one above the other.

Accordingly, it is an object of the present invention to provide a brake valve for a hydraulic brake system which avoids by simple means the aforementioned shortcomings and drawbacks encountered in the prior art.

Another object of the present invention resides in a brake valve for a hydraulic brake system, especially for two circuit brake systems which dispenses with the need of separate pressure tanks or accumulators for each brake circuit.

A further object of the present invention resides in a brake valve for a hydraulic brake system which is simple in construction and utilizes relatively few parts.

Still another object of the present invention resides in a brake valve for hydraluic brake systems, especially two-circuit brake systems in which identical components can be used for both brake circuits.

A further object of the present invention resides in a brake valve for hydraulic brake systems which makes possible the attainment of brake characterstics that are dependent on the piston travel of the master piston.

Still another object of the present invention resides in a brake valve for hydraulic brake installations in which the valve is so constructed as to be able to assure an absolutely tightness even in the presence of the high pressures which may occur in the system.

Another object of the present invention resides in a brake valve of the type described above which permits the use of an advantageous and simple pressure control valve as well as seals which are fully adequate for all contingencies in the operation of the system.

These and further objects, features and advantages of the present invention will become more apparent from the following description when taken in connection with the accompanying drawing, which shows, for purposes of illustration only, one embodiment in accordance with the present invention, and wherein:

The single FIGURE is a cross-sectional view through a servo-brake valve of a two-circuit brake system, constituted by two identical brake valves, including a schematic illustration of the associated circuits.

Referring now to the single FIGURE of the drawing, two master cylindres generally designated by reference numerals 2 and 3 are arranged one above the other in a common valve housing 1, of which the upper master cylinder 2 actuates the rear axle brakes 4 and the lower master cylinder 1 the front axle brakes 5. One master piston 6 each is arranged in the two master cylinders 2 and 3, which extends through a closure plate 8 toward the outside by means of a piston rod 7. The two piston rods 7 are actuated from a brake pedal 10 by way of an equalization lever 9 schematically illustrated as a scale beamlike member. The strokes are thereby dimensioned corresponding to the required volumes between the rear axle brake 4 and the front axle brake 5. One main-spring 11 is arranged on the inside of each of the master cylinders 2 and 3 which is supported at the respective master piston 6. The free ends of the main springs 11 are provided with spring disks or plates 12 which are mounted on plungers 13. The plungers 13 are guided in rings 14 which are provided on their sides facing the master piston 6 with a sealing ring 15, to which is coordinated a knife edge ring 16 of the spring plate 12. A plate 17 each is arranged at the free ends of the plungers 13, which together with a respective piston 18 forms a plate seal. The piston 18 whose travel in the direction of the plate 17 is limited by an abutment 19, is supported at a closure screw 21 by way of a spring 20. The piston 18 which is guided in a valve bushing 22 forms together with the valve sleeve 22 a pressure control or regulating valve. The valve sleeve 22 is provided with radial bores 23 which lead to a connection 24 that is connected with a pressure tank or accumulator 25 of any conventional construction. A check valve 26 is arranged in each of the lines leading to the pressure tank or accumulator 25 which prevents a return flow in the direction toward the pressure accumulator 25.

The piston 18 of the lower master cylinder 3 intended for the front axle brakes 5 forms together with the valve bushing 22 a slide valve whereas the piston 18 of the upper master cylinder 2 which is intended for the rear axle brakes 4, forms together with the valve bushing 22 a cone valve. In practice, however, the brake valves would always be equipped with two identical slide valves or with two identical cone valves. The two pistons 18 include each an axial piston bore 27 whose end facing the plate 17 is constructed as conical bore which has a base area that is larger than the cross sectional area of the plunger 13.

One connection 28 each leads from the plate valve, constituted between the respective plate 17 and piston 18, of both master cylinders 2 and 3 to a tank or reservoir 29. A connection 30 each is provided to the rear of the pressure control valves constituted by the pistons 18 and the valve sleeves 22 within the area of the closure screws 21; the connection 30, in turn, is connected to a connection 32 by way of a line 31 with the master cylinders 2 and 3 to the rear of the back side of the master pistons 6. In this description as well as in the claims, the term "rear side" of the master piston 6 and the like is the right side thereof as viewed in the single FIGURE of the drawing whereas the front side thereof is the left side thereof as viewed in the drawing. On the one hand, a check valve 33 is connected in this line 31 which is adjusted to a predetermined pressure valve, for example, to two (2) atmospheres excess pressure and which in case of an excess pressure within the area of the pressure control valve releases or opens up the connection to the backside of the master piston 6. A further check valve 34 is arranged in line 31 in parallel with this check valve 33, which connects the parts 32 ane 30 when the pressure on the backside of the master piston 6 is larger than within the area of the pressure control valves.

The master cylinders 2 and 3 additionally include connections 35 which connect the pressure space in front of the pistons 6 with the rear axle brakes 4 and the front axle brakes 5, respectively. A valve 36 each is arranged in the lines leading to the rear axle brakes 4 and to the front axle brakes 5 which in the presence of an anti-locking system discharges or relieves the pressure from the wheel brake cylinders into the tank 29. The pressure space in front of the master piston 6 is additionally provided with a connection 37 that leads to a control valve generally designated by reference numeral 38. The control valves 38 include each a piston 39 whose front side (left side as viewed in the drawing) is acted upon with the pressure of the pressure space of the master pistons 6, whereas their backside (right side as viewed in the drawing) is acted upon with the pressure of the pressure control valve by way of a branch line 40 branching off from the line 31. The pistons 39 are provided on their backside with a needle 41 each, which is coordinated to a check valve 42. Additionally, the pistons 39 are provided on their backside with knife edge ringS 43. The check valve 42 is connected by way of the connection 32 with the backside of the master pistons 6 and leads to the tank 29. The check valve 42 opens in the presence of a vacuum with respect to the tank 29 on the backside of the master pistons 6 or when it is displaced into the open position by the needle 41.

If with an intact pressure tank or accumulator 25 the brake pedal 10 is actuated, then it displaces by way of the equalization lever 9 which uniformly distributes the pedal force, the two master pistons 6 which are then moved toward the left as viewed in the drawing. The spring plates 12 are thereby displaced by way of the mainsprings 11 against the slight force of the fixing springs 44 which are arranged between the rings 14 and the spring plates 12 surrounding the plungers 13.

The spring plates 12 take along the plungers 13 inclusive of their sealing plates 17 and move the same toward the conical bores of the pistons 18.

The oil volume which the master pistons 6 displaces during this movement, is forced back into the tank 29 through the plate valve which closes slowly. The space resulting on the backside of the master pistons 6 brings about a vacuum which sucks in oil out of the tank 29 by way of the check valve 42 of the control valve 38.

After the plate valve has been closed, the oil displaced by the master pistons 6 which continues to move, is forced into the brakes 4 and 5. This is possible since the check valve 33 is prestressed to about 2 atmospheres excess pressure.

After a further travel of the master pistons 6, the force of the mainspring 11 suffices in order to overcome by way of the spring plate 12, the plunger 13 and the piston 18 the force of the spring 20 and then to displace the piston 18. When the overlap of the pressure regulating valve which is constituted respectively by the pistons 18 and the valve sleeves 22, is overtravelled, then the pressure control operation commences.

If up to that instant the vent play in the brakes 4 or 5, for example, the vent play in the brake jaws or calibers of brake disks is overcome, then a pressure will establish itself in the pressure space in front of the master pistons 6 and in the brake lines which increases above 2 atmospheres excess pressure. As a result thereof, the oil is forced by way of the check valves 33 to the backsides of the master pistons 6 and the check valves 42 of the control valves 38 close.

From the pressure accumulator 25 the accumulator pressure which may amount, for example, 160 atmospheres excess pressure is available at the pressure control or regulating valve by way of the check valve 26. When the piston 18, during the described actuation of the brake, opens up the flow between the valve sleeve 22 and the piston bore 27, then the accumulator or servo-oil flows through the piston bore 27. The oil flows by way of the closed plate valve and the plunger 13 into the pressure space in front of the master piston 6. For that purpose both the plate 17 as also the plunger 13 are provided with bores 45 and 46 disposed coaxially to the piston bore 27. The bore 46 of the plunger 13 is constructed as dead end bore which is adjoined by several radial bores 47 that terminate in the pressure space to the rear of the ring 14 and in front of the master piston 6. Additionally, pressure oil flows from the pressure control valve (18/22) by way of the connection 30, the line 31 and the check valve 33 to the connection 32 and therewith to the backside of the master piston 6.

The pressure control or regulating valve constituted by the piston 18 and the valve sleeve 22 closes the accumulator oil supply when the regulated pressure is so high that the pressure which acts on the differential surface between the plunger 13 and the conical bore of the piston 18, overcomes the spring force of the mainspring 11. The piston 18 is then closed by the spring 20. The controlled or regulated pressure multiplied by the differential area between the cross section of the plunger 13 and the base of the conical bore of the piston 18 then corresponds to the spring force of the mainspring 11. The spring force of the mainspring 11 is dependent, on the one hand, on the travel of the master pistons 6 and on the spring constants whereas the force in equilibrium therewith is dependent on the controlled pressure and the constant differential area. The spring travel is therefore proportional to the adjusted or controlled pressure so that a predetermined controlled braking pressure is coordinated to a predetermined position of the master pistons 6 to which appertains a predetermined prestress of the mainspring 11.

In case an anti-locking system is provided, if oil is discharged by way of the valves 36 in order to decrease the braking pressure, the brake valve will nevertheless keep constant the oil pressure corresponding to the spring force of the mainspring 11 with constant pedal position.

The reaction force to be applied to the piston rods 7 is composed of the spring force of the mainsprings 11 and the adjusted pressure multiplied by the cross-sectional area of the piston rods 7. Since this force is composed of the adjusted pressure and of a constant area, and since also the spring force is formed by the adjusted pressure and another constant area, also the reaction force is proportional to the adjusted pressure. It follows therefrom that a predetermined regulated pressure and a predetermined reaction force which corresponds to the force to be applied, is coordinated to a predetermined piston position of the master piston which corresponds to a predetermined pedal position. It can be seen from the foregoing explanation that the characteristics of the brake valve are determined by the selection of the mainsprings 11.

If after the braking disappearing the brake pedal 10 is retracted, then the spring forces of the mainspring 11 decrease. The oil on the backside of the master pistons 6 is circulated by way of the check valves 34 and the lines 31 to the front side of the master pistons 6. The volume thereby increases somewhat by the disappearing piston rods 7. The pressure in the system decreases, yet is nevertheless still so high that the pressure force applied against the plates 17 is larger than the spring force of the mainsprings 11 so that the plate valve opens and the oil can escape into the tank 29.

During the normal operation, i.e., when the pressure tank or accumulator 25 is properly functioning, only the check valve 42 of the control valve 38 comes into operation in order to avoid a vacuum on the backside of the master pistons 6 as long as the pressure control valves do not yet operate. The same pressure acts on the piston 39 on both sides thereof. Even though with high pressures a force acting toward the right as viewed in the drawing results from the presence of the needle 41, this force is smaller than the force acting on the ball of the check valve 42 since the seating surface of the check valve 42 is considerably larger than the needle surface. The check valve 42 therefore remains closed. The piston 39 is slightly moved to and fro during each braking operation so that it cannot become stuck. If the pressure accumulator 25 is defective, i.e., fails to provide hydraulic medium under pressure, then the actuation at first is the same as described hereinbefore. However, since no accumulator pressure is produced, the pressure control operation of the pressure control valve constituted by the piston 18 and the valve sleeve 22 cannot commence. In order to achieve a brake force, the brake pedal 10 is further depressed so that the master pistons 6 and the mainsprings 11 are displaced further toward the left as viewed in the drawing. The spring plates 12 thereby displace the valve plungers 13, the pistons 18 and the springs 44 and 20 for such length of time until the spring plates 12 abut with their knife edge rings 16 at the sealing rings 15 of the rings 14 and therewith close the knife edge valves. During this time a predetermined pressure builds up in the brakes 4 and 5 determined by the check valve 33. The master pistons 6 suck oil out of the tank 29 onto the backsides thereof by way of the check valve 42 of the control valve 38.

If the knife edge valve constituted by the spring plate 12 on the fixed ring 14 is closed, then the pressure space in front of the master pistons 6 is closed with respect to the pressure control valve and the accumulator 25 so that a brake valve without amplification or servo effect is achieved. For purposes of attaining a predetermined braking pressure, the required foot force has to be applied at the pedal which is larger by the amplification factor of the accumulator or servo-operation.

The piston 39 of the control valve 38 is acted upon with the brake pressure only on its front side so that it is displaced toward the right as viewed in the drawing and with its needle 41 keeps the check valve 42 in the open position. The piston 39 is sealed off against the pressure of the tank 29 by means of the knife edge ring 43 provided on its backside.

If for purposes of disengaging the brake pedal 10 is retracted, then the pressure in the brake valve decreases corresponding to the increased volume in front of the master pistons 6. The oil to the rear of the master pistons 6 has to be discharged pressureless into the tank 29, for which purpose is utilized the check valve 42 opened by the brake pressure since the plate valve between the plunger 13 and the piston 18 is kept closed by the mainsprings 11.

The brake valve according to the present invention additionally offers the safety that the pressue tank or accumulator 25 does not empty out if one of the two brake circuits has failed due to a brake in the brake line or due to rupture of a brake hose or the like. If the brake pedal 10 is actuated after one of the brake circuits has failed, then the associated pressure control valve is nonetheless opened. The adjusted pressure is fed back undiminished by way of the line 31, the check valve 33 and the connection 32 to the backside of the master pistons 6. In contradistinction thereto, on the front side of the associated master piston only a reduced pressure can build up within the master cylinder 2 or 3 since the pressure oil can escape by way of the connection 35. This pressure difference becomes still greater when the radial bores 47 of the plunger 13 act as throttles with respect to the axial bores 46. The resulting pressure difference brings about that the respective master pistons 6 is displaced with respect to its mainspring 11 whereby the connection of the piston rod 7 with the brake pedal is disengaged. The master pistons 6 then move against the spring plate 12 and forces the knife edge ring 16 thereof against the sealing ring 15 of the ring 14. As a result thereof, the connection 35 is closed off with respect to the pressure tank or accumulator 25. The respective pressure control valve is thereby further opened so that nearly the full accumulator pressure acts against the backside of the master pistons 6 whereas no pressure builds up in the master cylinder 2 or 3. Since the effective area of the backside of the master pistons 6 is larger than the effective area of the knife edge ring 16 and the control surface of the pressure control valve, and since both sides in the closed condition of the knife edge valve constituted by the knife edge ring 16 and the sealing ring 15 are acted upon by the same pressure, the closed position is maintained until a repair is carried out.

If no pressure builds up in the master cylinder 2 or 3, then the piston 39 of the control valve 38, which on its backside is acted upon with the regulated or adjusted pressure by way of the lines 31 and 40, is displaced into its end position, in which its front side abuts with knife edge rings 48 at its housing and in this manner provides a seal with respect to the failing brake circuit.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A brake valve for a hydraulic brake installation, especially of a motor vehicle, which includes a master cylinder with a master piston in said master cylinder having a front side and a back side and actuatable by way of a piston rod, a pressure space on one side of said master piston in said master cylinder, means for connecting said pressure space with a brake, servo means for applying a controlled servo pressure to said pressure space as well as the back side of said piston, characterized in that the pressure space of the master piston is provided with a valve which is kept open during the actuation of the brake by the controlled servo pressure of said servo means and which, when open, connects the pressure space with pressure control valve means for controlling the servo pressure of said servo means.

2. A brake valve for a hydraulic brake installation, especially of a motor vehicle, which includes a master cylinder means with a master piston means having a front side and a back side and actuatable by way of a piston rod, a pressure space in said cylinder means adapted to be connected wiJh a brake, said pressure space as well as the back side of said piston means being adapted to be acted upon by a controlled servo pressure, characterized in that the pressure space of the master piston means is provided with a valve means which is kept open during the actuation of the brake by the controlled servo pressure and which, when open, connects the pressure space with a pressure control valve means controlling the servo pressure, a main spring displaceable by the master piston means is arranged in the master cylinder means, a spring plate means is provided at the free end of the main spring, said spring plate means being mounted on a substantially coaxial plunger means of a plate valve means that is constituted by a plate member at the end of the plunger means and a piston is displaceable against a spring, said piston together with a connection for a pressure accumulator forming part of the pressure control valve means, which is in communication with the pressure space of the master piston means by way of a substantially axial piston bore in said piston, a bore is provided in the plate member and bores in the plunger mPans, the piston bore having at its end cooperating with the plate member a cross-sectional area that is larger than the cross-sectional area of the plunger means.

3. A brake valve according to claim 2, characterized in that the connection through the plunger means between the pressure space of the master piston means and the pressure control valve means is adapted to be closed by the spring plate means.

4. A brake valve according to claim 3, characterized in that the spring plate means is provided with a knife edge ring to which is coordinated a sealing ring which is provided in a ring means guiding the plunger means.

5. A brake valve according to claim 4, characterized in that the plunger means is surrounded by a fixing spring which is supported at the spring plate means and the ring means.

6. A brake valve according to claim 5, characterized in that the piston is guided in a valve sleeve means which is provided with radial channel means adapted to be connected with the pressure accumulator.

7. A brake valve according to claim 6, characterized in that the piston together with the channel means forms a slide valve and is provided with radial bores leading to the piston bore.

8. A brake valve according to claim 6, characterized in that the piston together with the valve sleeve means forms a cone valve.

9. A brake valve according to claim 6, characterized in that a control valve device is connected to the pressure space of the master piston means which includes a piston whose back side is provided with a needle means and which is connected to the pressure control valve means in front of the plate valve means.

10. A brake valve according to claim 9, characterized in that the control valve device includes a check valve adapted to the opened by means of the needle means of its piston, said check-valve being disposed in a connection between the back side of the maser piston means and a tank and being operable to open in case of a vacuum on the back side of the master piston means.

11. A brake valve according to claim 10, characterized in that the front side and back side of the piston of the control valve device are constructed as knife edge valves.

12. A brake valve according to claim 10, characterized in that the back side of the master piston means is connected with the pressure control valve means in front of the plate valve means by way of a line in which is arranged a check valve that is prestressed to a predetermined pressure valve and which opens in case of an excess pressure in the pressure control valve means.

13. A brake valve according to claim 12, characterized in that the back Side of the master piston means is connected with the pressure control valve means in front of the plate valve means by way of a line in which is arranged a check valve opening in case of an excess pressure on the back side of the master piston means.

14. A brake valve for a two circuit brake system according to claim 13, characterized in that two similar master cylinder means are arranged one above the other which are connected to a common brake pedal by way of a scale beam-like equalization lever means.

15. A brake valve according to claim 14, characterized in that a common valve housing is provided for the two master cylinder means.

16. A brake valve according to claim 15, characterized in that the two brake circuits include within the common housing identical components as to the respective brake valve parts thereof.

17. A brake valve according to claim 2, characterized in that the spring plate means is provided with a knife edge ring to which is coordinated a sealing ring which is provided in a ring means guiding the plunger means.

18. A brake valve according to claim 17, characterized in that the plunger means is surrounded by a fixing spring which is supported at the spring plate means and the ring means.

19. A brake valve according to claim 2, characterized in that the piston is guided in a valve sleeve means which is provided with radial channel means adapted to be connected with the pressure accumulator.

20. A brake valve according to claim 19, characterized in that the pistons together with the channel means forms a slide valve and is provided with radial bores leading to the piston bore.

21. A brake valve according to claim 19, characterized in that the piston together with the valve sleeve means forms a cone valve.

22. A brake valve according to claim 2, characterized in that a control valve device is connected to the pressure space of the master piston means which includes a piston whose back side is provided with a needle means and which is connected to the pressure control valve means in front of the plate valve means.

23. A brake valve according to claim 22, characterized in that the control valve device includes a check valve adapted to be opened by means of the needle means of its piston, said check-valve being disposed in a connection between the back side of the master piston means and a tank and being operable to open in case of a vacuum on the back side of the master piston means.

24. A brake valve according to claim 22, characterized in that the front side and backside of the piston of the control valve device are constructed as knife edge valves.

25. A brake valve according to claim 22, characterized in that the back side of the master piston means is connected with the pressure control valve means in front of the plate valve means by way of a line in which is arranged a check valve that is prestressed to a predetermined pressure value and which opens in case of an excess pressure in the pressure control valve means.

26. A brake valve according to claim 22, characterized in that the back side of the master piston means is connected with the pressure control valve means in front of the plate valve means byway of a line in which is arranged a check valve opening in case of an excess pressure on the backside of the master piston means.

27. A brake valve according to claim 26, characterized in that the back side of the master piston means is connected with the pressure control valve means in front of the plate valve means by way of a line in which is arranged a check valve that is prestressed to a predetermined pressure value and which opens in case of an excess pressure in the pressure control valve means.

28. A brake valve according to claim 27, characterized in that the control valve device includes a check valve adapted to be opened by means of the needle means of its piston, said check-valve being disposed in a connection between the back side of the master piston meanS and a tank and being operable to open in case of a vacuum on the back side of the master piston means.

29. A brake valve for a two circuit brake system according to claim 1, characterized in that two similar master cylinder means are arranged one above the other which are connected to a common brake pedal by way of a scale beam-like equalization lever means.

30. A brake valve according to claim 29, characterized in that a common valve housing is provided for the two master cylinder means.

31. A brake valve according to claim 30, characterized in that the two brake circuits include within the common housing identical components as to the respective brake valve parts thereof.

* * * * *